United States Patent [19]

Ward

[11] 4,416,396
[45] Nov. 22, 1983

[54] PORTABLE FUEL AND OIL DISPENSING CONTAINER

[76] Inventor: Jackson G. Ward, P.O. Box 241, Prairie Grove, Ark. 72753

[21] Appl. No.: 233,049

[22] Filed: Feb. 10, 1981

[51] Int. Cl.³ ............................................. B67D 5/08
[52] U.S. Cl. .................................. 222/129; 222/510; 222/530
[58] Field of Search ............ 222/129, 185, 510, 481.5, 222/527, 529, 530

[56] References Cited

U.S. PATENT DOCUMENTS

| | | | |
|---|---|---|---|
| 1,015,420 | 1/1912 | Bumann | 222/482 |
| 1,778,383 | 10/1930 | Fry | 222/510 |
| 1,832,798 | 11/1931 | Taylor | 222/185 |
| 2,319,517 | 5/1943 | Rand | 221/67 |
| 2,842,294 | 7/1958 | Crowder | 222/510 X |
| 4,098,437 | 7/1978 | Reinke | 222/529 |
| 4,125,207 | 11/1978 | Ernst et al. | 222/130 |

Primary Examiner—Joseph J. Rolla
Assistant Examiner—Michael S. Huppert
Attorney, Agent, or Firm—Robert R. Keegan

[57] ABSTRACT

There is disclosed a dispenser and container for fuel and oil having separate compartments, including three legs which lift the bottom of the fuel and oil compartments off the ground by about a foot. Each compartment is provided with an opening at the bottom connecting to a hose several feet long so that fuel or oil will flow by gravity into the tank of a chain saw or similar internal combustion engine powered device resting on the ground. The outlets for the hoses are provided with valves which are operated from the top of the dispenser and automatically vent the containers and the hoses for free-flow of the fuel or lubricating oil. The dispenser includes compartments built into the top for carrying tools, rags, replacement parts, etc. A retaining groove and clip is provided for each hose for convenience in transporting the dispenser.

13 Claims, 8 Drawing Figures

PORTABLE FUEL AND OIL DISPENSING CONTAINER

The present invention relates to portable dispensers for fuel or lubricating oil; it is particularly directed to such a portable dispenser for use with small gasoline engine powered tools such as chain saws, brush trimmers, line grass trimmers, and the like.

The dispenser according to the invention includes compartments both for gasoline (or other fuel), and for lubricating oil, together with compartments suitable for storage of the customary wrenches, screwdrivers, sharpeners, replacement chain, chain guard, or other parts likely to be needed in connection with the operation of a chain saw. This permits the chain saw operator to move through dense woods or other rough terrain on foot while carrying a chain saw in one hand and the portable fuel and oil dispenser in the other hand, thereby transporting all of the fuel, oil and tools necessary to be self-sufficient in operating the chain saw in an area remote from his truck or other vehicle.

Conventional "gas cans" and improvised containers for gas and oil are generally quite inefficient for use with small gasoline engine powered equipment. The inadequacy of such fuel and oil containers arises from several sources. The opening in the fuel tank of the chain saw or other device is usually not very large. It will not accept the usual gas can spout and pouring a steady stream into the small opening without spilling is most difficult. Funnels, pumps, siphons, and other aids are not much more satisfactory. The usual gas can is too heavy to manipulate readily with one hand and generally necessitates two-hand operation. This means that the chain saw cannot be held by a free hand but must somehow be propped in the right orientation to give proper access to the fuel tank filler opening. This presents many opportunities for spilling the fuel, as when a precariously balanced saw becomes unbalanced from the weight of the fuel being added.

Similar problems prevail in getting lubricating oil into gasoline engine powered tools; this is aggravated further by the frequently inconvenient location of the lubricating oil filler cap; pouring directly from an oil can makes spilling almost unavoidable. In general, the operation of dispensing fuel (or oil) to chain saws or similar apparatus is not satisfactorily met by traditional gas cans or other known containers and dispensers. The dispensing operation with such devices is likely to be both wasteful and hazardous. An example of proposed solutions to some of these problems is shown in U.S. Pat. Nos. 1,653,661 to Riley; 3,154,219 to Dean et al; 3,756,470 to Bagwell et al; and 3,782,602 to Page. None of these disclosures teach the controlled gravity flow and hose arrangement of applicant's apparatus.

By the present invention a dispenser and tool carrier is provided which overcomes obstacles discussed above and provides a most efficient aid to the chain saw operator who must walk long distances through rough, brushy terrain to get to a work location.

A generous supply of fuel and lubricating oil, as well as essential tools and equipment, may be carried in the dispenser according to the invention requiring use of only one hand and thus freeing the other hand for carrying the chain saw.

The dispensing operation is greatly facilitated by the fact that the dispenser compartments are supported well above the ground and provided with hoses which permit gravity filling of the chain saw fuel tank and oil reservoir. Hoses are provided with small end fittings which readily fit into the fuel filler or the oil filler openings, respectively. The flow through the hoses is controlled by a valve at the base of the fuel compartment (or oil compartment), and this valve is preferably controlled by a push button on the top of the dispenser. The dispenser rests on the ground with the fuel tanks in an elevated position and does not need to be supported by the operator. One hand may be used to locate and retain the hose end fitting in the filler opening and at the same time steady the chain saw. The other hand is free to operate the valve button to control the flow of liquid.

When the button is depressed to open the valve for the fuel tank an air vent to the top of the tank is opened at the same time to avoid a formation of a vacuum in the tank which would retard fuel flow. When the valve is closed by release of the push button, the fuel tank is then closed but a different vent is opened to the hose nipple so that the fuel in the hose empties out freely and quickly thus preventing drips and spills from this source.

In addition to providing the above described advantages and features, it is an object of the present invention to provide a container and dispenser unit for two different liquids having individual dispensing hoses and control valves, and particularly suited for dispensing fuel and lubricating oil to small gasoline engine powered devices.

It is another object of the present invention to provide a two-liquid dispenser and container which also includes compartments for storing tools necessary and convenient for servicing a gas engine powered device.

It is still another object of the present invention to provide a portable two-container unit with dispensing hoses and dispensing valves and having legs which raise the containers a substantial vertical distance to facilitate gravity flow of the liquids from the containers; the legs may be formed as a unit with the containers or may be separate folding leg elements.

Other objects and advantages of the invention will be apparent from consideration of the following description in conjunction with the appended drawings in which.

Figure 1:
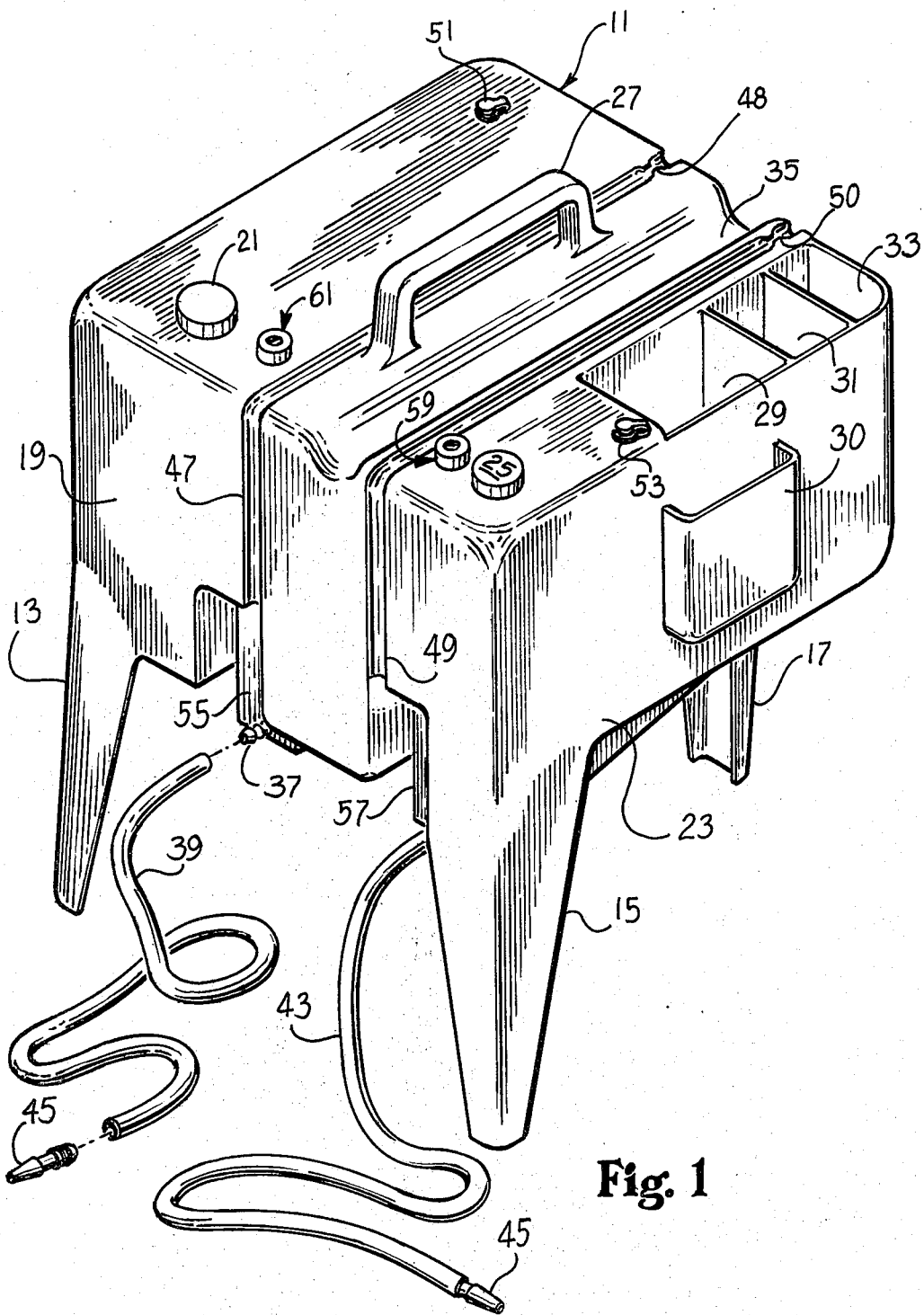
FIG. 1 is a top perspective view of a portable fuel and oil dispensing container according to the invention.
Figure 2:
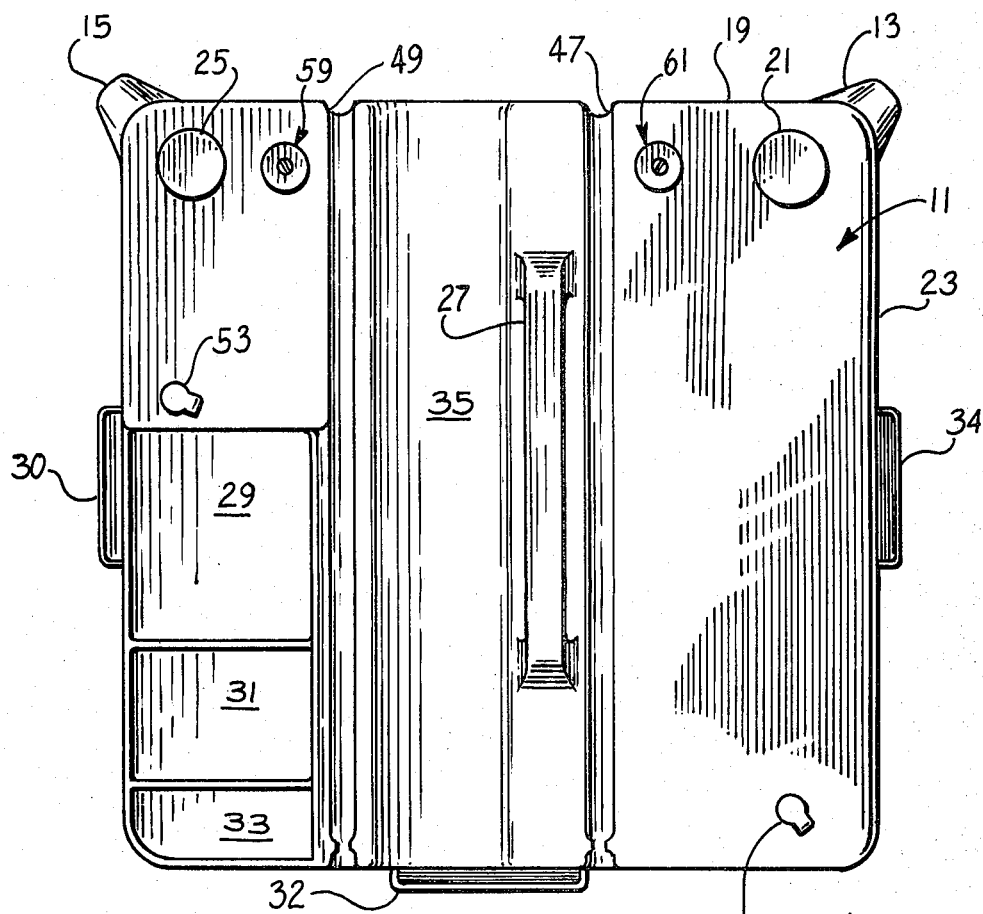
FIG. 2 is a top plan view of the apparatus of FIG. 1.

Referring now to the drawings and particularly to FIGS. 1-4, a portable fuel and oil dispenser 11 is shown, which is preferably formed of molded rigid or semi-rigid plastic by injection molding, blow molding, vacuum molding, or other suitable process. The dispenser may be formed in two or more pieces and joined by adhesives, heat sealing, or other suitable methods. The joints must, of course, be resistant to gasoline, oil, alcohol or other fuels to be carried in the container.

The dispenser includes three legs 13, 15, and 17, which, in the embodiment of FIG. 1, are formed integrally with the body of the dispenser. The dispenser includes a fuel tank portion 19 which may have a volume of two to four gallons typically, and a somewhat smaller lubricating oil container 23, which may have a volume of two to four quarts. The capacity of the dispenser may vary to suit the purpose intended. The two liquid containers 19 and 23 are provided with respective filler caps 21 and 25.

A handle 27 is provided on the top of the dispenser centrally located. Handle 27 may be formed integrally with the dispenser body, or may be formed separately and secured in place by adhesive or other suitable means. Open-topped bins 29, 31, and 33 are provided for carrying needed tools and accessories for the chain saw or other equipment with which the dispenser 11 is to be used. They may be provided with a hinged cover if desired. Other compartments 30, 32, and 34 on the sides and rear of the dispenser may also be utilized for tools, cleaning rags, spare cutting chains, or other spare parts.

A depression or corrugation 35 is provided in the top of the dispenser body which is helpful in rigidifying the body in the vicinity of the handle 27. Optionally, corrugations and/or depressions may be provided elsewhere in the body for rendering the structure more rigid, or they all may be omitted as desired.

Gas compartment 19 is provided with a hose 39 connected to a nipple 37 in the bottom of the container; and end fitting 45 is provided for hose 39. Similarily hose 43 is provided for lubricating oil compartment 23 and is attached to a nipple similar to nipple 37 (not shown), and is provided with an end fitting 45.

Grooves 47 and 49 are formed in the dispenser body to accommodate hoses 39 and 43, respectively. Fittings 45 clip into clips 48 and 50. Grooves 47, 49 also serve to rigidify the structure. If the structure is molded in parts and assembled by adhesive bonding, it may be convenient to provide the separation between parts at grooves 47 and 49. Also the internal separation between container 19 and 23 (not shown) may very conveniently be placed vertically in alignment with groove 49. Each of the containers 19 and 23 is provided with a respective pressure release vent cap 51 and 53. These are conventional molded plastic openings with integral captured press-fit caps. They may be designed to open and release excessive pressure build-up.

Figure 3:
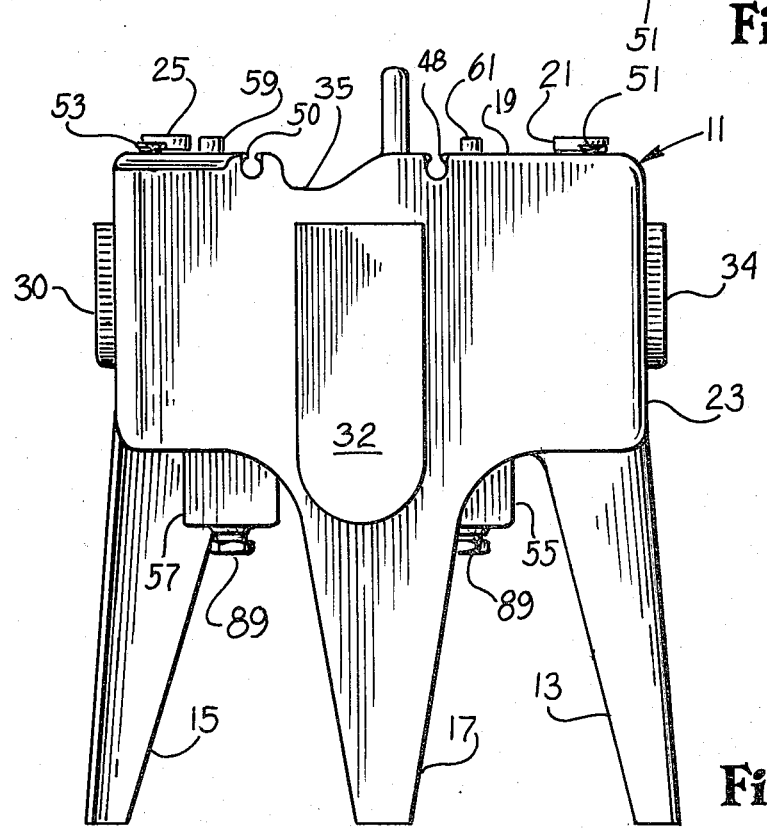
FIG. 3 is a rear elevational view of the apparatus of FIG. 1.
Figure 4:
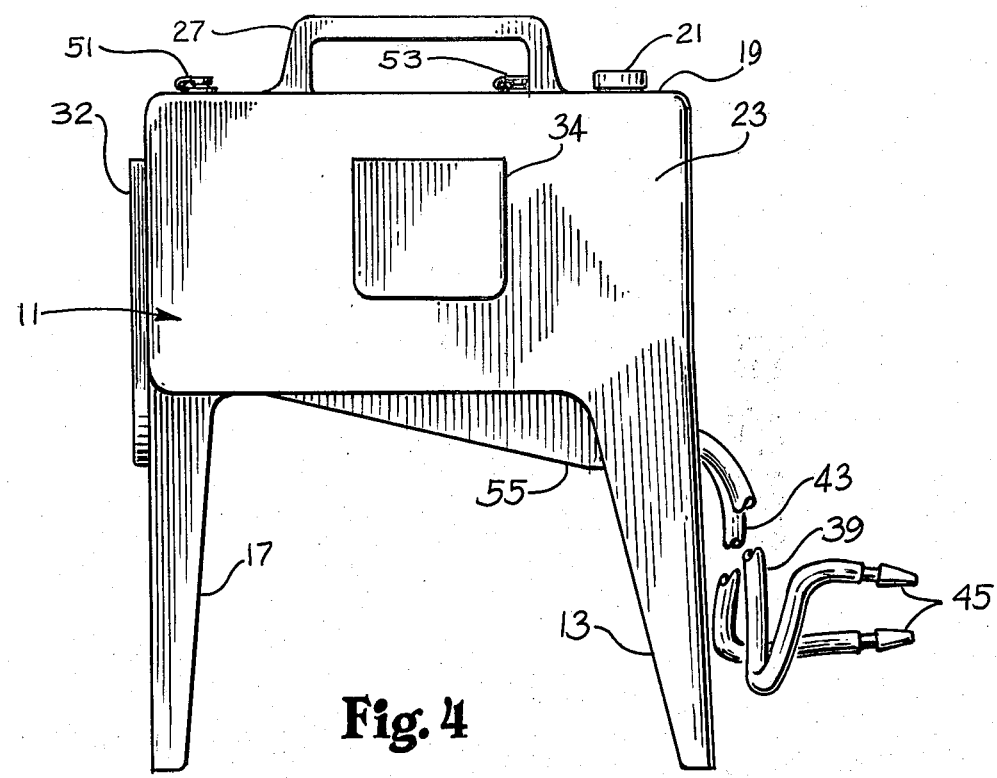
FIG. 4 is a side elevational view of the apparatus of FIG. 1.

As seen in FIGS. 1, 3, and 4, the containers 19 and 23 have respective sloped bottom portions 55 and 57. These container portions 55 and 57 extend below the remainder of the bottom of the containers so that when the liquid level is low it will be collected, in portion 55 for example, even though the dispenser 11 is not precisely level.

Figure 5:
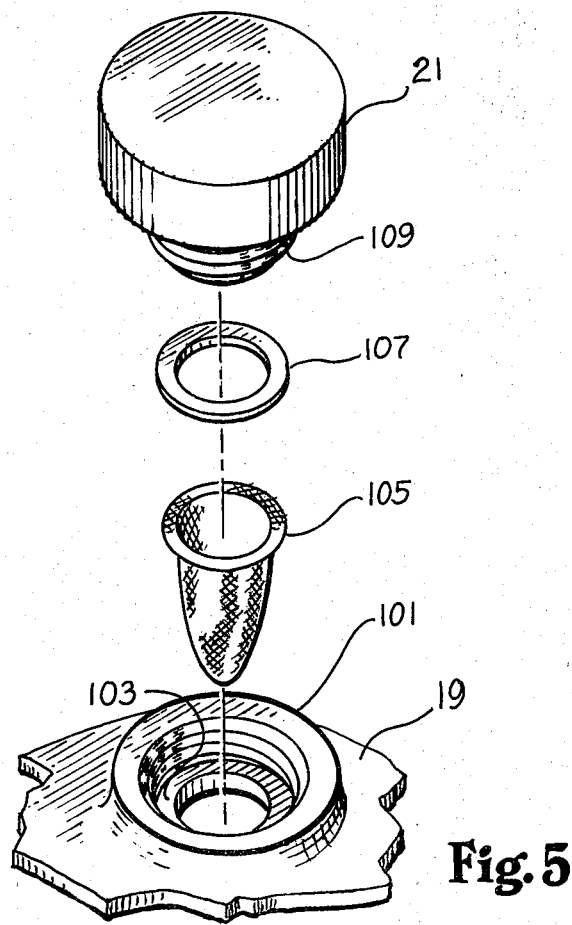
FIG. 5 is an exploded perspective detailed view of the filler opening and cap portion of the apparatus of FIG. 1.

FIG. 5 shows a detailed view of filler opening 101 of compartment 19 and filler cap 21 serving as a closure therefor. Opening 101 is threaded and has a seat 103 in the bottom portion thereof. Seat 103 supports a flanged filter screen 105 of brass or other suitable noncorroding material. A washer of rubber, neoprene, or other suitable resilient material is shown at 107. Washer 107 rests on the top of screen 105 and provides sealing engagement with the lower surface of the threaded portion 109 of filler cap 21. Screen 105 is removable for cleaning.

Figure 6:
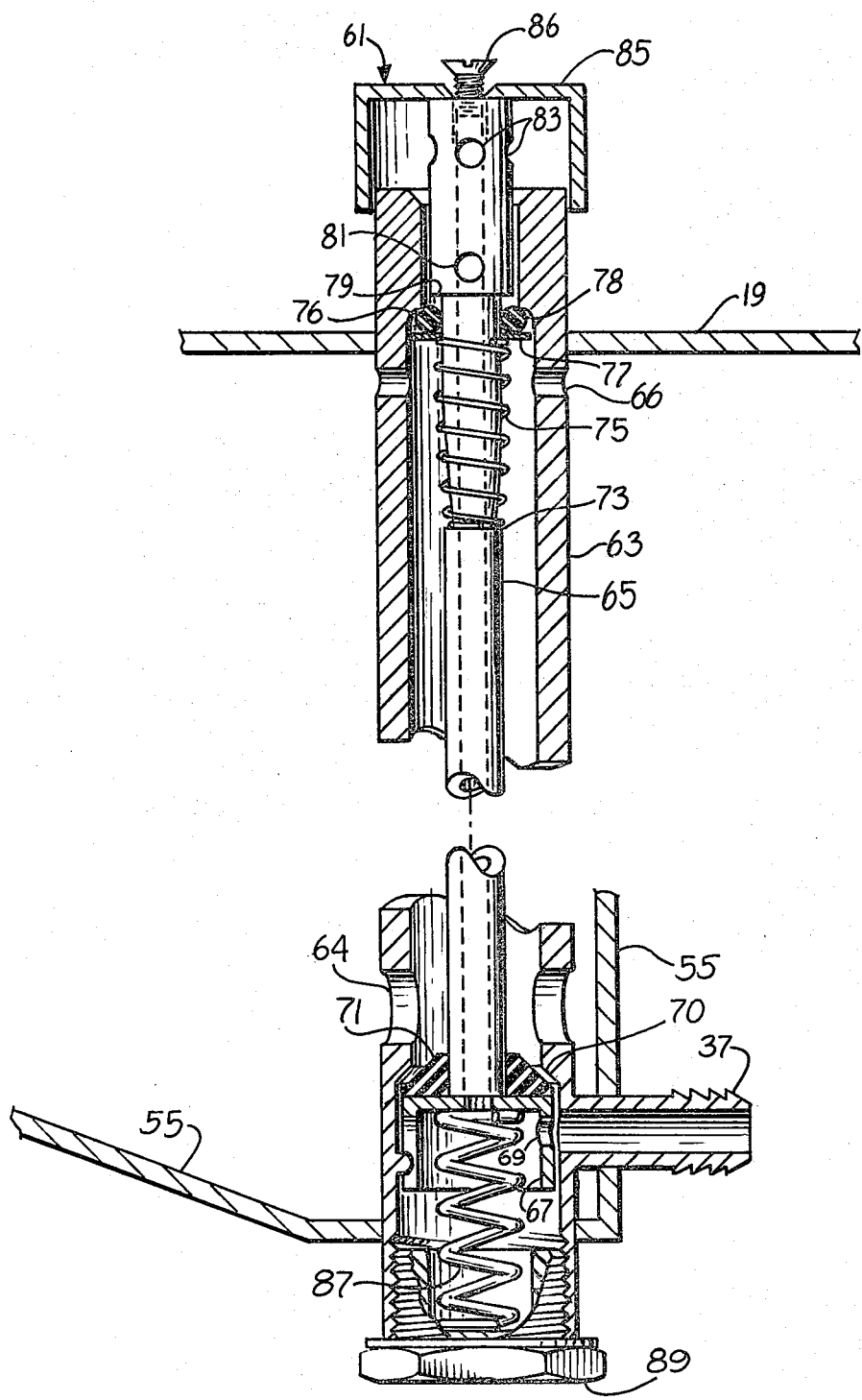
FIG. 6 is an elevational partially sectional view of the dispensing valve of the apparatus of FIG. 1.

FIG. 6 is a detailed drawing partially in section of the valve element 61 for controlling fuel flow from container compartment 19 through hose 39. Essentially the same or similar construction may be utilized for valve element 59 controlling the lubricating oil flow from compartment 23 through hose 43. The different viscosities and other characteristics of the two liquids may make it desirable to provide slight differences in opening sizes, etc., as between valve element 59 and valve element 61 as will be understood by those skilled in the art. Other known valve structures may be employed as alternatives to the embodiment illustrated.

Valve element 61 includes a casing 63 extending from top to bottom of compartment 19. Openings 64 in the lower end thereof and openings 66 in the upper end communicate with the interior of compartment 19. Openings 64 permit fuel to flow into casing 63, and openings 66 permit air to pass out of casing 63. Concentric with casing 63 is a hollow push rod 65 with an enlarged portion 67 fitting with only a small clearance in the bottom portion of casing 63.

A hole 69 in enlarged portion 67 aligns with the opening in nipple 37. A neoprene plastic washer 71 of conical shape seats against a conical seat in the bottom of casing 63 forming a valve for controlling the flow of fuel from container compartment 19.

Push rod 65 near the top has a lip 73 which engages the smaller end of a coil spring 75. The upper larger end of coil spring 75 urges a metal washer 77 and an O-ring 78 against an abuttment 76 in the interior of casing 63. In the nearly closed position for the fuel valve as shown in FIG. 6, O-ring 78 is urged upwardly by spring 75 closing the passage from the interior of compartment 19 through the hollow center of casing 63. Push rod 65 has lower openings 81 and upper openings 83, and, in the valve closed position, communication of those openings to the interior of the container is closed off. In the position shown, and more particularly when the fuel valve washer 71 is fully seated in its conical seat to close the fuel valve, the hollow interior of push rod 65 is isolated from the interior of the container but at the same time provides an air passage from openings 83 through the hollow push rod and its enlarged portion 67 and opening 69 to nipple 37 and thence to liquid fuel hose 39.

A cylindrical push button 85 on the top of push rod 65 is retained by screw 86 or other suitable conventional fastener. The push rod 65 and push button 85 are urged to the upward position by a spring 87 seated in the enlarged portion 67 of push rod 65. Spring 87 is retained in position by screw cap 89 threadedly engaged in the bottom of casing 63. Casing 63 is preferably secured in a hole in the top of compartment 19 with a heat seal joint or adhesive joint and may be similarily secured in a hole in the bottom of compartment 19. In particular, the valve element 61 is preferably located at the lowest part of slanted portion 55 of compartment 19. It will be noted that by unscrewing screw 86 and removing screw cap 89 the interior of casing 63 is accessible for cleaning, repair or replacement of parts.

While the operation of the apparatus of the invention will be understood from the previous description by those skilled in the art, it may be summarized as follows. Assuming that the dispenser is being used with a gasoline powered chain saw, it will be understood that the compartments 29, 30, 31, 32, 33, and 34 will be utilized to store tools, cleaning cloths, spare parts, and other necessary and useful items for operating and maintaining the chain saw in the field. Lubricating oil compartment 23 will be filled with the appropriate lubricating oil for the chain saw by removal of filler cap 25. It may be noted that compartments 29, 31, and 33 may or may not extend for the full depth of the dispenser body depending on the volume that is desired for the lubricating oil compartment 23. Furthermore, the apportionment of volume between lubricating oil compartment 23 and fuel compartment 19 may be varied as desired. Of course the overall volume may be selected also with a view to the particular use intended for the container and dispenser.

Vents 53 and 51 may be opened to release air and facilitate filling of compartments 23 and 19, but this will normally be unnecessary. Compartment 19 is filled through filler cap 21 and will be filled with the proper fuel or mixture of fuel and oil for the chain saw or other device so that no fuel mixing need be done at the job site.

When the container and dispenser is used to refill the chain saw with fuel in the field, the chain saw will normally be placed on the ground or other flat surface with the fuel filler opening substantially upright and open. The container and dispenser 11 will be placed in proximity to the chain saw in a convenient position and hose 39 will be removed from channel 47 by removing fitting 45 from slip 48. Hose end fitting 45 will be placed in the fuel filler opening and may, if necessary, be held in position while at the same time steadying the chain saw with the same hand. Fuel may then be controllably dispensed to the chain saw fuel tank by depressing the button 85 of valve element 61. Before the fuel tank is completely full the valve button 85 will be released which will close off the flow of fuel from within compartment 19 and permit the fuel within hose 39 to empty into the tank. As necessary, lubricating oil will be dispensed through hose 43 in a similar fashion. When the container dispenser is to be transported to a new location hoses 39 and 43 will be situated in channels 47 and 49 and clipped in position with clips 48 and 50 so that the dispenser may be moved through brush and rough terrain without catching the hoses on limbs or other obstructions.

Figure 7:
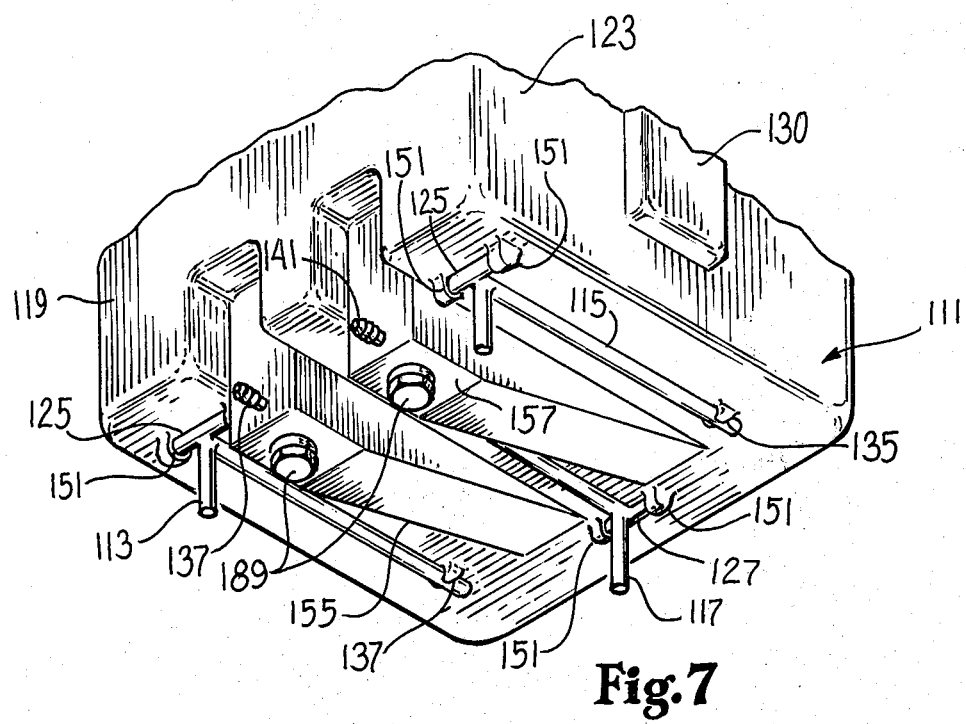
FIG. 7 is a bottom perspective view of an alternative arrangement of folding legs for a portable fuel and oil dispensing container according to the invention.
Figure 8:
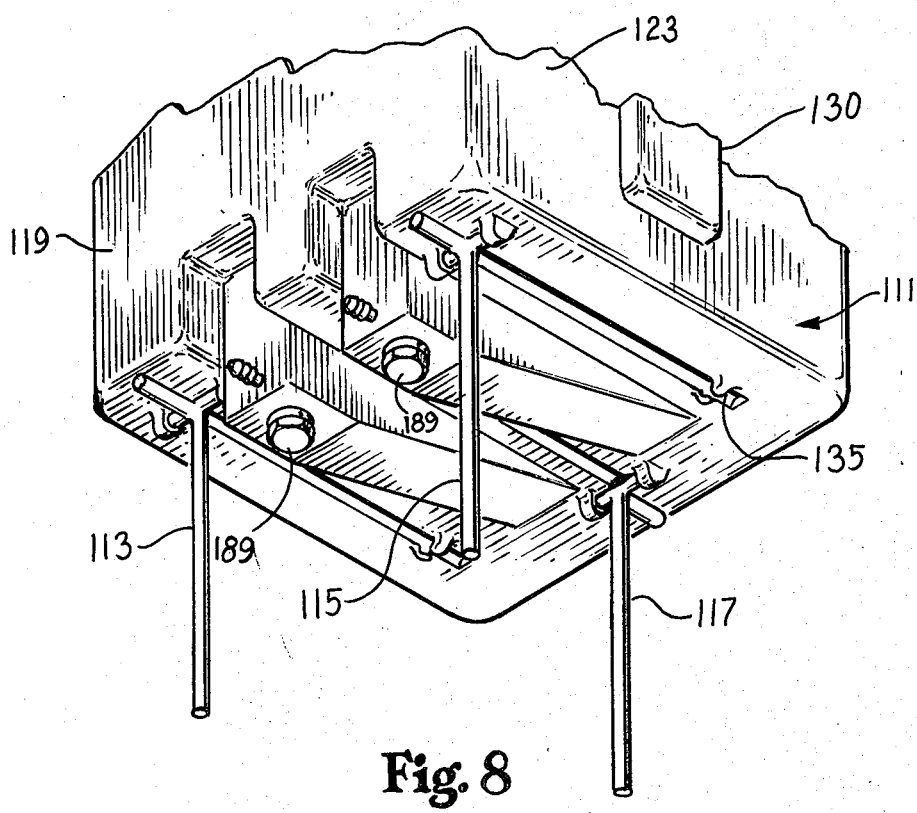
FIG. 8 is a bottom perspective view of the apparatus of FIG. 7 showing the legs in the extended position.

FIGS. 7 and 8 show an alternative embodiment of the invention in which folding legs are provided rather than the integrally formed legs 13, 15, and 17 of FIG. 1. In FIG. 7 only the bottom of the dispenser is shown, it being understood that the top thereof will be similar to or identical to that shown in FIGS. 1 through 6. The dispenser 111 includes fuel and oil compartments 119 and 123 having slanted bottom portions 157 and valve element retainer caps 189. Nipples 137 and 141 extend from the compartments 119 and 123 for connection with the hoses (not shown).

Dispenser 111 has three folding leg elements 113, 115, and 117. The legs 113, 115, and 117 are pivotally attached to the bottom of the dispenser by means of their respective integral pivot portions 123, 125, and 127, which are snapped into trunnions 151 formed integrally in the bottom of dispenser 111. Leg elements 113, 115, and 117 have a short portion and a long portion at right angles and FIG. 7 shows the short portions thereof in operative position. In FIG. 8 a dispenser is shown with the leg elements 113, 115, and 117 rotated to place the long portion of the legs in operative position and raise the bottom of compartments 119 and 123 by a substantial distance above the surface on which the dispenser is resting. This distance may be about one foot or greater.

From the foregoing description it will be seen that the container and dispenser apparatus of the invention is especially convenient in that not only fuel and oil, but all other needed tools and accessories are transportable in one hand leaving the operator free to carry the chain saw with the other hand. The legs are of sufficient length so that when the chain saw is placed on the ground the fuel filler or oil filler will be below the level of the bottom of the container. Also the location of the liquid outlets at the very bottom of the compartments avoids the problems with ordinary gas cans which tend to collect water at the bottom of the can. Thus ordinary gas cans accumulate additional water with each refilling until eventually fuel with very high water content is dispensed when the container is nearly empty. While the location of the fuel valve in the body of the dispenser is desirable to prevent leaks from a broken or disconnected hose, a valve may be placed at the end of the hose in addition to or in place of the valve in the dispenser body.

In addition to those variations and modifications of the invention described, illustrated, or suggested herein, other variations and modifications will be apparent to those skilled in the art and accordingly the scope of the invention is not to be deemed limited to the particular embodiments described or suggested but is rather to be determined by reference to the appended claims.

What is claimed is:

1. A dual container and dispenser for two different liquids comprising
   a unitary dispenser body having first and second adjoining isolated compartments suitable for liquid containment,
   a conduit in communication with the interior of said first compartment near the bottom thereof,
   a hose connected to said conduit,
   a valve member including a normally closed liquid valve connected internally to said conduit to control liquid flow therethrough and a passage from the top exterior of said liquid compartment to the portion of said conduit exterior to said valve,
   means including an external actuating member for opening said liquid valve upon manual operation of said actuating member, and
   leg members for supporting said dispenser with the bottom of said compartments spaced above the surface on which said dispenser is placed.

2. Apparatus as recited in claim 1 wherein said valve member includes a vent valve to provide an opening for air through the top of said compartment at the same time said liquid valve opens the conduit from the interior of said first compartment.

3. Apparatus as recited in claim 1 wherein said actuating member is at the top of said body and said valve member further includes a mechanical connection from said liquid valve to said actuating member.

4. Apparatus as recited in claim 1 wherein said leg members are an integral part of said body.

5. Apparatus as recited in claim 1 wherein said leg members are pivotally mounted on the bottom of said body for movement between an extended and a retracted position.

6. A container and dispenser comprising
   a unitary dispenser body having a compartment suitable for liquid internal combustion engine fuel,
   a conduit in communication with the interior of said compartment near the bottom thereof,
   a hose,
   means for connecting said hose externally to said conduit, a valve member including a normally closed fuel valve placed internally in said conduit to control liquid flow therethrough and a passage from the top exterior of said compartment to the portion of said conduit exterior to said valve, means including an external actuating member for opening said fuel valve upon manual operation of said actuating member, and leg members for supporting said dispenser with the bottom of said compartment spaced above the surface on which said dispenser is placed.

7. Apparatus as recited in claim 6 wherein said valve member includes a vent valve to provide an opening for air through the top of said compartment at the same time said fuel valve opens the conduit from the interior of said first compartment to said hose.

8. Apparatus as recited in claim 6 wherein said leg members are an integral part of said body.

9. A dual container and dispenser for two different liquids comprising a unitary dispenser body having first and second adjoining isolated compartments suitable for liquid internal combustion engine fuel and lubricating oil respectively, said first compartment being at least about twice the volume of said second compartment, a conduit in communication with the interior of said first compartment near the bottom thereof, a hose, means for connecting said hose externally to said conduit, a valve member including a normally closed fuel valve placed internally in said conduit to control liquid flow therethrough, a passage from the top exterior of said fuel compartment to the portion of said conduit exterior to said fuel valve, and a hose vent valve for at least partially closing the path through said passage when said fuel valve is open, means including an external actuating member for opening said fuel valve upon manual operation of said actuating member, and leg members for supporting said dispenser with the bottom of said compartments spaced above the surface on which said dispenser is placed.

10. A container and dispenser comprising a unitary dispenser body having a compartment suitable for liquid internal combustion engine fuel, a conduit in communication with the interior of said compartment near the bottom thereof, a hose, means for externally connecting said hose to said conduit, a valve member including a normally closed fuel valve connected internally to said conduit to control liquid flow therethrough and a passage from the top exterior of said fuel compartment to the portion of said conduit exterior to said fuel valve, and means including an external actuating member for opening said fuel valve upon manual operation of said actuating member.

11. Apparatus as recited in claim 10 wherein said valve member includes a vent valve to provide an opening for air through the top of said compartment at the same time said fuel valve opens the conduit from the interior of said first compartment to said hose.

12. Apparatus as recited in claim 10, wherein said actuating member is at the top of said body and said valve member further includes a mechanical connection from said liquid valve to said actuating member.

13. Apparatus as recited in claim 12 wherein said mechanical connection includes a tubular member extending between said valve and said actuating member and a rigid rod internal thereto for communicating motion of said actuating member of said fuel valve for operation thereof.

* * * * *